United States Patent
Loh et al.

(10) Patent No.: US 6,472,006 B1
(45) Date of Patent: Oct. 29, 2002

(54) OVEN-STABLE EDIBLE MOISTURE BARRIER

(75) Inventors: Jimbay P. Loh, Green Oaks; Timothy S. Hansen, Chicago, both of IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 20 days.

(21) Appl. No.: 09/826,604

(22) Filed: Apr. 5, 2001

(51) Int. Cl.$^7$ .............................. A23D 9/00; A23P 1/08

(52) U.S. Cl. ........................ 426/99; 426/302; 426/307; 426/138; 426/606; 106/219; 106/220; 106/221

(58) Field of Search ............................ 426/99, 98, 302, 426/303, 307, 138, 553, 554, 653, 518, 606; 106/219–221; 241/24.16, 24.26

(56) References Cited

U.S. PATENT DOCUMENTS

| | | | |
|---|---|---|---|
| 3,471,304 A | * 10/1969 | Handy | 106/184.3 |
| 3,968,261 A | * 7/1976 | Goodman | 426/564 |
| 4,086,367 A | * 4/1978 | Ziccarelli | 426/102 |
| 4,207,347 A | * 6/1980 | D'Atri et al. | 426/102 |
| 4,401,681 A | 8/1983 | Dahle | |
| 4,661,359 A | 4/1987 | Seaborne et al. | |
| 4,671,963 A | * 6/1987 | Germino et al. | 426/101 |
| 4,710,228 A | 12/1987 | Seaborne et al. | |
| 4,810,534 A | 3/1989 | Seaborne et al. | |
| 4,871,558 A | * 10/1989 | Tackikawa et al. | 426/307 |
| 4,880,646 A | 11/1989 | Lew et al. | |
| 4,915,971 A | 4/1990 | Fennema et al. | |
| 5,064,669 A | * 11/1991 | Tan et al. | 426/307 |
| 5,098,725 A | * 3/1992 | Rotman et al. | 426/548 |
| 5,130,151 A | * 7/1992 | Averbach | 426/302 |
| 5,215,780 A | * 6/1993 | Meidenbauer | 426/100 |
| 5,391,383 A | * 2/1995 | Sullivan et al. | 426/291 |
| 5,401,518 A | 3/1995 | Adams et al. | |
| 5,403,601 A | * 4/1995 | Komai et al. | 426/607 |
| 5,439,700 A | * 8/1995 | Cain et al. | 426/607 |

(List continued on next page.)

OTHER PUBLICATIONS

Greener, et al., 1989a "Barrier properties and surface characteristics of edible, bilayer films", *J. Food Sci*, 54(6), 1393–1399.

Greener et al., 1989b "Evaluation of edible, bilayer films for use as moisture barriers for food", *J. Food Sci.*, 54(6), 1400–1406.

Kamper, S., et al., 1985 "Use of an edible film to maintain water vapor gradients in foods", *J. Food Sci.*, 50, 382–384.

Kester, J., et al., 1989, "Resistance of lipid films to water vapor transmission", *J. Am. Oil Chem Soc.*, 66(8), 1139–1146.

*Primary Examiner*—Carolyn Paden
(74) *Attorney, Agent, or Firm*—Fitch, Even, Tabin & Flannery

(57) ABSTRACT

An oven-stable edible moisture barrier for food products is provided. This oven-stable moisture barrier is useful in preventing moisture migration within a multi-component food product between components having different water activities even when the multi-component food product is exposed to elevated temperatures. The oven-stable edible moisture barrier of this invention is formed from a composition comprising an edible, low melting oil having a melting point of about 35° C. or lower and an edible, high melting fat having a melting point of about 70° C. or higher, wherein the edible, low melting oil and the edible, high melting fat are co-micromilled at a temperature above the melting point of the edible, low melting oil but below the melting point of the edible, high melting fat to form a cream-type mixture. This composition has unique thermal and mechanical properties that makes it ideal as an edible moisture barrier for use in food products, especially for baking applications.

39 Claims, 4 Drawing Sheets

U.S. PATENT DOCUMENTS 5,626,902 A * 5/1997 Kuramori et al. ............ 426/607
5,641,528 A * 6/1997 Cain et al. .................. 426/606
5,660,865 A * 8/1997 Pedersen et al. ............ 426/307
5,698,248 A * 12/1997 Lonergan .................... 426/102
5,766,659 A * 6/1998 Asama et al. .................. 426/1
6,004,615 A * 12/1999 Kim et al. .................. 426/533

* cited by examiner

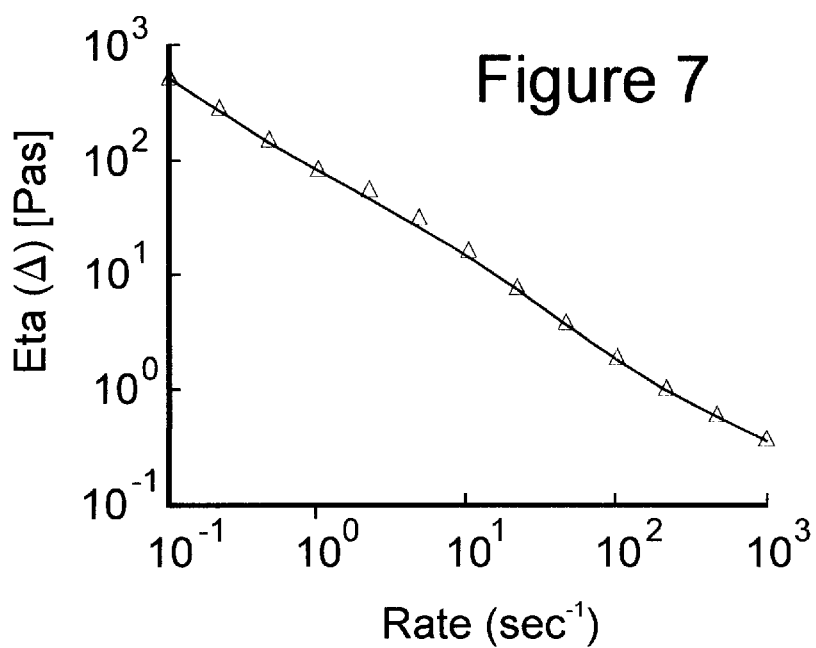
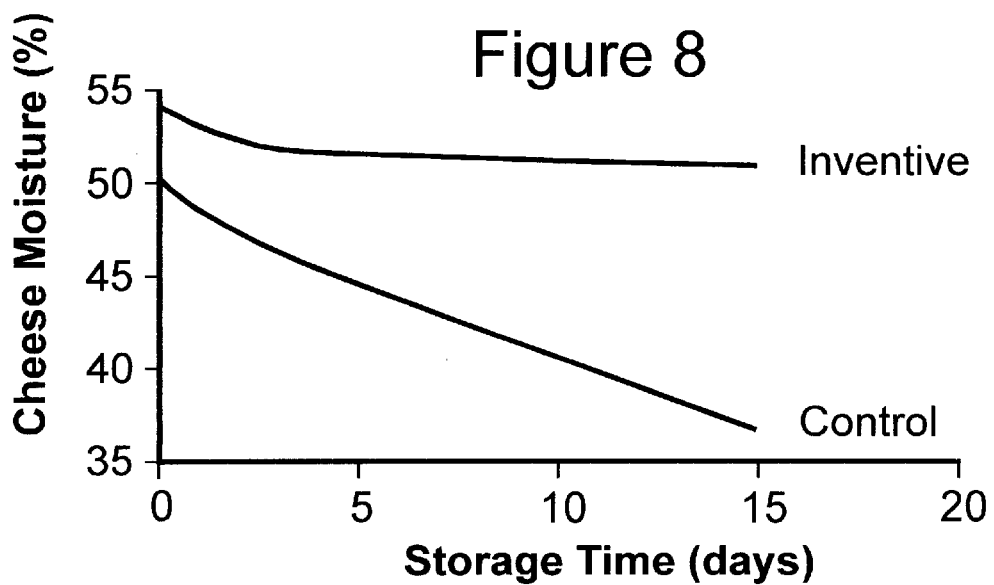

OVEN-STABLE EDIBLE MOISTURE BARRIER

FIELD OF THE INVENTION

The present invention relates to an oven-stable edible moisture barrier for food products. More particularly, the oven-stable moisture barrier is useful in preventing moisture migration within a multi-component food product between components having different water activities even when the multi-component food product is exposed to elevated temperatures. The oven-stable edible moisture barrier of this invention is formed from a composition comprising an edible, low melting oil having a melting point of about 35° C. or lower and an edible, high melting fat having a melting point of about 70° C. or higher, wherein the edible, low melting oil and the edible, high melting fat are co-micromilled at a temperature above the melting point of the edible, low melting oil but below the melting point of the edible, high melting fat to form a cream-type mixture. This composition has unique thermal and mechanical properties that makes it ideal as an edible moisture barrier for use in food products, especially for baking applications.

BACKGROUND

For many food products, moisture levels must be maintained if the product is to exhibit optimum organoleptic properties, quality, and taste. Moisture migration in finished food products can seriously compromise quality, stability, and organoleptic properties. In addition, many chemical and enzymatic deteriorative reactions proceed at rates partially governed by the moisture content of foods. Excessive rates of these reactions can promote deleterious changes in the flavor, color, texture, and nutritive value of food products.

In multi-component food products, particularly those having components with different moisture contents and water activities (e.g., prepackaged cheese and crackers or prepackaged bagel and cheese cream products), moisture can migrate between adjacent components, altering the component's characteristics and organoleptic properties. In addition to compromising the quality of finished food products, moisture migration can hinder production and distribution of food products. Thus, for example, the cheese in a cheese/cracker product could dry out while, at the same time, the cracker losses its crispness.

One method to prevent moisture migration in foods involves coating one or more surfaces of the food product with an edible moisture barrier. Such barriers should have a low moisture permeability in order to prevent the migration of water between areas of differing water activities. In addition, the barrier should cover the food surface completely, including crevices, and adhere well to the food product surface. The moisture barrier should be sufficiently strong, soft, and flexible to form a continuous surface that will not crack upon handling, yet can be easily penetrated during consumption. In addition, the barrier film's organoleptic properties of taste, aftertaste, and mouthfeel should be imperceptible so that the consumer is not aware of the barrier when the food product is consumed. Finally, the moisture barrier should be easy to manufacture and easy to use.

Because lipids, such as, for example, oils, fats, and waxes, are composed of lipophilic or water insoluble molecules capable of forming a water impervious structure, they have been investigated for use in moisture barrier films. With respect to oleaginous materials (i.e., fats, oils, sucrose polyesters, and the like) and/or other film forming lipids, it has been shown that, unless an undesirably thick coating is used, the barrier is not effective. Such film forming lipids tend to melt and run under normal baking conditions and, thus, loss film integrity and barrier effectiveness. Wax barriers have disadvantages as moisture barriers because they tend to crack upon handling or with changes in temperatures. Accordingly, many of the barriers in the art use a water-impermeable lipid in association with hydrocolloids or polysaccharides such as alginate, pectin, carrageenan, cellulose derivatives, starch, starch hydrolysates, and/or gelatin to form gel structures or crosslinked semi-rigid matrixes to entrap and/or immobilize the nonaqueous material. In many cases these components are formed as bilayer films. These bilayer films may be precast and applied to a food surface as a self-supporting film with the lipid layer oriented toward the component with highest water activity. See, for example, U.S. Pat. No. 4,671,963 (Jun. 9, 1987), U.S. Pat. No. 4,880,646 (Nov. 14, 1987), U.S. Pat. No. 4,915,971 (Apr. 10, 1990), and U.S. Pat. No. 5,130,151 (Jul. 14, 1992).

There are, however, a number of drawbacks associated with these moisture barriers. The hydrocolloids themselves are hydrophilic and/or water soluble and thus tend to absorb water with time. The absorption of water by the hydrophilic material in moisture barrier is greatly accelerated while the film is directly in contact with foods having a water activity ($A_w$) above 0.75. The water absorption rate of the hydrophilic material is further accelerated at elevated temperature rendering the barrier ineffective for applications wherein the moisture barrier will be exposed to heat (e.g., baking applications). In addition, some hydrocolloids tend to make the barriers fairly stiff, requiring the addition of a hydrophilic plasticizer (e.g., polyol) to increase flexibility. These plasticizers are often strong moisture binder themselves thus promoting moisture migration into the barriers and decreased structural stability of the barriers. Furthermore, the texture and the required thickness of some of these barriers may make their presence perceptible and objectionable when the product is consumed.

It would be desirable, therefore, to provide an improved edible moisture barrier which retains its effectiveness when exposed to elevated temperatures (i.e., those normally associated with cooking and/or baking). The present invention provides such an oven-stable edible moisture barrier.

SUMMARY

The present invention provides an oven-stable edible moisture barrier for food products. This oven-stable moisture barrier is useful in preventing moisture migration within a multi-component food product between components having different water activities and/or moisture contents even when the multi-component food product is exposed to elevated temperatures. The oven-stable edible moisture barrier of this invention is formed from a composition comprising an edible, low melting oil having a melting point of about 35° C. or lower, preferably about 15 to about 30° C., and an edible, high melting fat having a melting point of about 70° C. or higher, wherein the edible, low melting oil and the edible, high melting fat are co-micromilled at a temperature above the melting point of the edible, low melting oil but below the melting point of the edible, high melting fat to form a cream-type mixture. Generally the particle size of the edible, high melting fat is reduced by micromilling to below about 25 microns and preferably in the range of about 1 to about 10 microns. This composition has unique thermal and mechanical properties that makes it ideal as an edible moisture barrier for use in food products, especially for baking applications.

The present invention also provides an edible moisture barrier and a method for preventing moisture migration between food components having different moisture levels. The edible moisture barrier of the invention has a low moisture permeability and is easy to manufacture and use with a variety of food products. The edible moisture barrier of the invention is effective for covering a food surface completely and providing a barrier that is sufficiently strong, soft, and flexible to form a surface that will resist cracking during handling and storage (both at refrigeration and ambient temperatures), but is easily penetrated during consumption, and which can undergo several heating cycles without significant deterioration of, for example, appearance, flavor, rheology, and/or barrier properties. The edible barrier of the invention has organoleptic properties of taste, aftertaste, and mouthfeel that are essentially imperceptible such that the consumer is unaware of the presence of the barrier when the product is consumed. The moisture barrier of the invention is effective for reducing moisture migration between foods at least about 50 percent, and more preferably at least about 90 percent, as compared to food where no moisture barrier is present.

The present invention also provides a method for reducing moisture migration between food components. In this aspect of the invention, the edible moisture barrier is brought into contact with a food component in an amount effective for reducing moisture migration from one food component to another. Generally, the edible moisture barrier is applied to the food component to form an essentially continues barrier layer at least about 10 microns thick, preferably about 20 to about 2000 microns thick, and more preferably about 50 to about 750 microns thick.

The present invention provides an edible moisture barrier composition suitable for forming an edible moisture barrier within a food product having components of differing water activities, said composition comprising an edible, low melting oil having a melting point of about 35° C. or less (preferably about 15 to about 30° C.) and an edible, high melting fat having a melting point of about 70° C. or higher, wherein the edible, low melting oil and the edible, high melting fat are co-micromilled at a temperature above the melting point of the edible, low melting oil but below the melting point of the edible, high melting fat to form a cream-type mixture. Typically, the composition contains about 60 to about 85 percent of the edible, low melting oil and about 15 to about 40 percent of the edible, high melting fat; preferably, the composition contains about 65 to about 75 percent of the edible, low melting oil and about 25 to about 35 percent of the edible, high melting fat.

The present invention also provides an edible moisture barrier between components of differing water activities in a food product, said edible moisture barrier comprising a layer of a composition comprising an edible, low melting oil having a melting point of about 35° C. or less (preferably about 15 to about 30° C.) and an edible, high melting fat having a melting point of about 70° C. or higher, wherein the edible, low melting oil and the edible, high melting fat are co-micromilled at a temperature above the melting point of the edible, low melting oil but below the melting point of the edible, high melting fat to form a cream-type mixture. Generally, the edible moisture barrier is at least about 10 microns thick, preferably about 20 to about 2000 microns thick, and more preferably about 50 to about 750 microns thick.

The present invention also provides a method for preventing moisture migration between a first food component and a second food component having different water activities in a food product, the method comprising:

(1) blending an edible, low melting oil having a melting point of about 15 to about 35° C. and an edible, high melting fat having a melting point of about 70° C. or higher to form a mixture;

(2) micromilling the mixture at a temperature above the melting point of the edible, low melting oil but below the melting point of the edible, high melting fat to form a cream-type mixture; and (3) applying the cream-type mixture to at least the first food component to form a layer of the edible moisture barrier effective for preventing moisture migration between the first component and the second food component. Generally, the moisture barrier is at least about 10 microns thick, preferably about 20 to about 2000 microns thick, and more preferably about 50 to about 750 microns thick. Preferably the mixture prior to micromilling is a coarse dispersion with the maximum particle size of the edible, high melting fat being less than about 1000 microns and preferably less than about 500 microns.

BRIEF DESCRIPTION OF THE FIGURES

FIG. 7 demonstrate extreme shear thinning flow properties of the barrier of this invention at 55° C. A low flow behavior index and sharply reduced viscosity at increasing shear rates are observed.

FIG. 8 compares moisture loss over time from a high $A_w$ cream cheese component to a low $A_w$ bread/bagel component with and without the inventive moisture barrier of Example 1.

DETAILED DESCRIPTION

Figure 1:
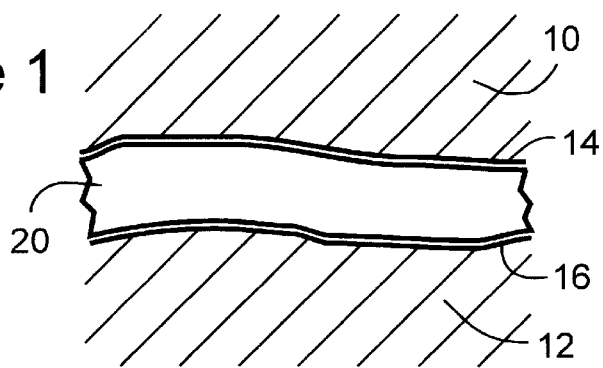
FIG. 1 is a schematic illustration of the edible moisture barrier of the present intention.

The present invention provides an oven-stable edible moisture barrier for food products. This oven-stable moisture barrier is useful in preventing moisture migration within a multi-component food product between components having different water activities even when the multi-component food product is exposed to elevated temperatures (e.g., an internal temperature of about 70° C. or higher). The oven-stable edible moisture barrier of this invention is formed from a composition comprising an edible, low melting oil having a melting point of about 35° C. or lower and an edible, high melting fat having a melting point of about 70° C. or higher, wherein the edible, low melting oil and the edible, high melting fat are co-micromilled at a temperature above the melting point of the edible, low melting oil but below the melting point of the edible, high melting fat to form a cream-type mixture. This composition has unique thermal and mechanical properties that makes it ideal as an edible moisture barrier for use in food products.

The present invention provides an edible moisture barrier and a method for preventing moisture migration between food components having different moisture levels. The edible moisture barrier of the invention has a low moisture permeability and is easy to manufacture and use with a variety of food products. The edible moisture barrier of the invention is effective for covering a food surface completely and providing a barrier that is sufficiently strong, soft, and flexible to form a surface that will resist cracking during handling and storage, but is easily penetrated during consumption, and which can undergo several heating cycles (e.g., between about 5 to about 80° C.) without significant deterioration. The edible barrier of the invention has organoleptic properties of taste, aftertaste, and mouthfeel that are imperceptible such that the consumer is unaware of the presence of the barrier when the product is consumed. The moisture barrier of the invention is effective for reducing moisture migration between foods at least about 50 percent, and preferably at least about 90 percent, as compared to food where no moisture barrier is present.

The present invention also provides a method for reducing moisture migration between food components. In this aspect of the invention, the edible moisture barrier is brought into contact with a food component in an amount effective for reducing moisture migration from one food component to another. Generally, the edible moisture barrier is applied to the food component to form an essentially continuous barrier layer at least about 10 microns thick, preferably about 20 to about 2000 microns thick, and more preferably about 50 to about 750 microns thick.

The present invention provides an edible moisture barrier composition suitable for forming an edible moisture barrier within a food product having components of differing water activities, said composition comprising an edible, low melting oil having a melting point of about 35° C. or lower and an edible, high melting fat having a melting point of about 70° C. or higher, wherein the edible, low melting oil and the edible, high melting fat are co-micromilled at a temperature above the melting point of the edible, low melting oil but below the melting point of the edible, high melting fat to form a cream-type mixture. Preferably, the edible, low melting oil and the edible, high melting fat are co-micromilled at a temperature of about 10° C. or more above the melting point of the edible, low melting oil and at a temperature of about 20° C. or more below the melting point of the edible, high melting fat to form the cream-type mixture. Typically, the composition contains about 60 to about 85 percent of the edible, low melting oil and about 15 to about 40 percent of the edible, high melting fat; preferably, the composition contains about 65 to about 75 percent of the edible, low melting oil and about 25 to about 35 percent of the edible, high melting fat.

The present invention also provides an edible moisture barrier between components of differing water activities in a food product, said edible moisture barrier comprising a layer of a composition comprising an edible, low melting oil having a melting point of about 35° C. or lower and an edible, high melting fat having a melting point of about 70° C. or higher, wherein the edible, low melting oil and the edible, high melting fat are co-micromilled at a temperature above the melting point of the edible, low melting oil to form a cream-type mixture. Generally, the edible moisture barrier is at least about 10 microns thick, preferably about 20 to about 2000 microns thick, and more preferably about 50 to about 750 microns thick.

The present invention also provides a method for preventing moisture migration between a first food component and a second food component having different water activities in a food product or between the food product and ambient environment, the method comprising:

(1) blending an edible, low melting oil having a melting point of about 35° C. or lower and an edible, high melting fat having a melting point of about 70° C. or higher to form a mixture;

(2) micromilling the mixture at a temperature above the melting point of the edible, low melting oil but below the melting point of the edible, high melting fat to form a cream-type mixture; and (3) applying the cream-type mixture to at least the first food component or to at least one outer surface of the food product to form a layer of the edible moisture barrier effective for preventing moisture migration between the first component and the second food component or between the food product and the ambient environment. Preferably the mixture is in the form of a coarse dispersion prior to the micromilling step. Typically, the mixture is micromilled to obtain the cream-type mixture having a particle size of about 1 to about 25 microns, preferably about 1 to about 15 microns, and more preferably about 1 to about 10 microns; generally, the particle size is preferably measured at about 10° C. above the melting point of the edible, low melting oil. Once formed, the cream-type mixture or moisture barrier composition can be applied directly to the food product or it can be stored for later application. The moisture barrier composition should be applied at a temperature sufficient to achieve the cream-type consistency. Once applied, the food product can be cooled to ambient or storage temperature so that the moisture barrier forms an essentially continuous layer over the coated surfaces. Generally, cream-type mixture is applied to at least one surface of the food product in an amount to form a moisture barrier of at least about 10 microns thick, preferably about 20 to about 2000 microns thick, and more preferably about 50 to about 750 microns thick.

FIG. 1 generally illustrates the moisture barrier of the present invention. Two food components 10 and 12, each having different water activities and surfaces 14 and 16, respectively, are separated by moisture barrier 20. The moisture barrier 20 resists moisture migration between the two components 10 and 12.

As used herein, "edible material" includes any material that does not have to be removed from the food component before it eaten (i.e., a material that can be safely chewed and ingested by the consumer).

As used herein, "barrier" or "moisture barrier" is understood to describe a thin continuous structure or layer that is essentially impermeable to moisture migration through it, and which coats an inner or outer surface of a food product. The barrier may be described as a coating, film, or membrane. The barrier can be placed between components having differing water activities within the food product to prevent or significantly reduce moisture migration between the components or on the outer surface of the food product to prevent or significantly reduce moisture migration between the food product and the ambient environment. The moisture barrier of this intention is designed to be used in direct contact with moist foods and to be effective against moisture migration through vapor equilibrium and/or liquid diffusion. For purposes of this invention, in the case of prevent moisture migration between the food product and the ambient environment, the first food component would be considered to be one or more outer surfaces of the food product and the second food component would be considered to be the ambient environment.

As used herein, "water activity" ($A_w$) is the ratio of vapor pressure of water in the food of interest and vapor pressure of pure water at the same temperature. As used herein, "oven stable" means that the barrier will retain its moisture barrier effectiveness after being heated to a temperature of about 70 to about 100° C.

Generally, the moisture barrier compositions of this invention comprise about 60 to about 85 percent of an edible, low melting oil having a melting point of about 35° C. or lower (and preferably about 15 to about 30° C.) and about 15 to about 40 percent of an edible, high melting fat having a melting point of about 70° C. or higher; preferably, the composition contains about 65 to about 75 percent of the edible, low melting oil and about 25 to about 35 percent of the edible, high melting fat. Suitable edible, low melting oils generally include hydrogenated or non-hydrogenated oils having the desired melting points. Suitable edible, low melting oils include natural or partially hydrogenated vegetable or animal oils including, for example, coconut oil, palm kernel oil, rapeseed oil, soybean oil, palm oil, sunflower oil, corn oil, canola oil, cottonseed oil, peanut oil, cocoa butter, anhydrous milkfat, lard, beef fat, and the like, as well as mixtures thereof. Preferred edible, low melting oils include coconut oil, palm kernel oil, anhydrous milkfat, and mixtures thereof.

Suitable edible, high melting fat for use in the present invention have a melting point of about 70° C. or higher. Preferred edible, high melting fats have melting points of about 80° C. or higher, and more preferably about 100° C. or higher. For purposes of this invention, the term "edible, high melting fats" includes edible long chain fatty acids, their monoglycerides, diglycerides, and triglycerides, their alkaline metal salts, and other derivatives thereof (e.g., high melting sucrose polyesters). Generally, the edible, high melting fats are formed from long chain fatty acids having at least about 16 carbon atoms and preferably about 18 to about 26 carbon atoms; preferably, the long chain fatty acids are saturated. Suitable saturated long chain fatty acids used to form the edible, high melting fats include, for example, stearic acid, arachidic acid, behenic acid, linoceric acid, and the like; their derivatives, including, for example, glycerol monostearate, glycerol distearate, glycerol tristerate, calcium stearate, magnesium stearate, high melting sucrose polyesters, high melting fatty alcohols, high melting waxes, and the like, as well as mixtures thereof. For purposes of this invention, "high melting" sucrose polyesters, fatty alcohols, and waxes include sucrose polyesters, fatty alcohols, and waxes with melting points greater than about 70° C.

Where inhibition of moisture migration between adjacent portions of a food product having different water activities is desired, the moisture barrier composition can be applied to the contacting surface of one (or both) portions and allowed to cool, before the portions are brought together. Where inhibition of moisture migration between a food product and the ambient environment is desired, the moisture barrier composition can be applied to one or more of the outer surfaces of the food product and allowed to cool. In one practice of the invention, the barrier is applied by immersing the food product, or simply the surface thereof to be coated, into a melted or molten moisture barrier composition, removing the food product, and allowing the coated product to cool. In another practice of the invention, the molten film is applied by brushing or otherwise applying the composition to the desired surface(s) of the product. Suitable techniques include, for example, dipping, pan coating, and use of a fluidized bed. In still another practice of the invention, the film can be applied using a spray, including atomized spray, air-brushing, and the like. Generally, the edible moisture barrier is applied to the food component to form an essentially continues barrier layer at least about 10 microns thick, preferably about 20 to about 2000 microns thick, and more preferably about 50 to about 750 microns thick.

Figure 2:
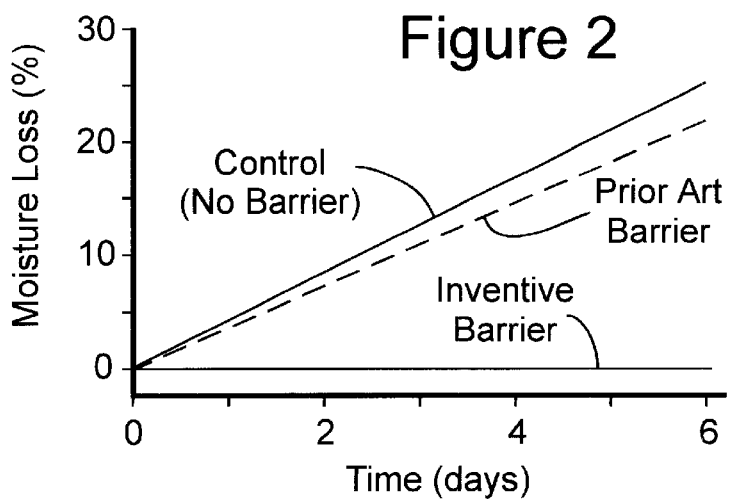
FIG. 2 illustrates the effectiveness of the present edible moisture barrier in a bagel/cream cheese model system with a water activity gradient of about 0.3 to about 0.95 after baking to about 80 to about 90° C. for about 20 minutes.

The edible moisture barriers of the present invention offer a number of advantages over prior art moisture barriers currently available. As illustrated in FIG. 2, the present edible moisture barriers are oven stable. Inventive and control moisture barriers were applied to a bagel/cream cheese model system which was then baked to about 80 to about 90° C. for about 20 minutes. The prior art barrier (i.e., Myvacet 7-07, an acetylated monoglyceride with a melting point of about 37 to about 40° C., applied at a thickness of about 500 microns) after baking exhibited essentially no barrier to moisture transfer (i.e., essentially the same moisture transfer properties as a product without a barrier). The edible moisture barrier of the present invention, on the other hand, maintained excellent moisture barrier properties after being exposed to the elevated temperatures. Thus, it is clear that the present edible moisture barrier are stable under baking conditions and offer a considerable advantage over currently available edible moisture barriers.

Figure 3:
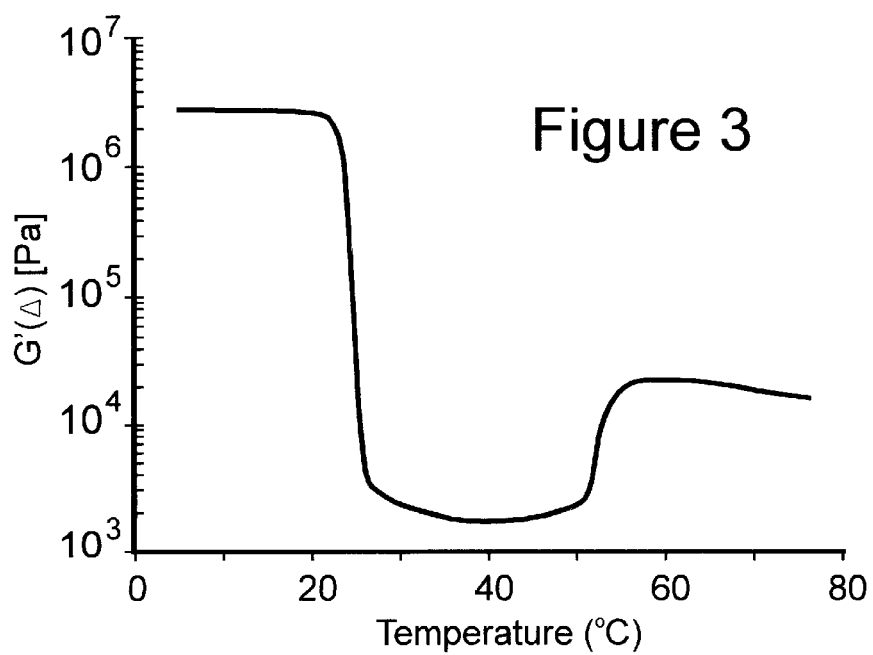
FIG. 3 illustrates the thermal and mechanical properties of the edible moisture barrier of this invention. The elastic modulus of the barrier, which is indicative of yield stress, is plotted as a function of temperature.
Figure 4:
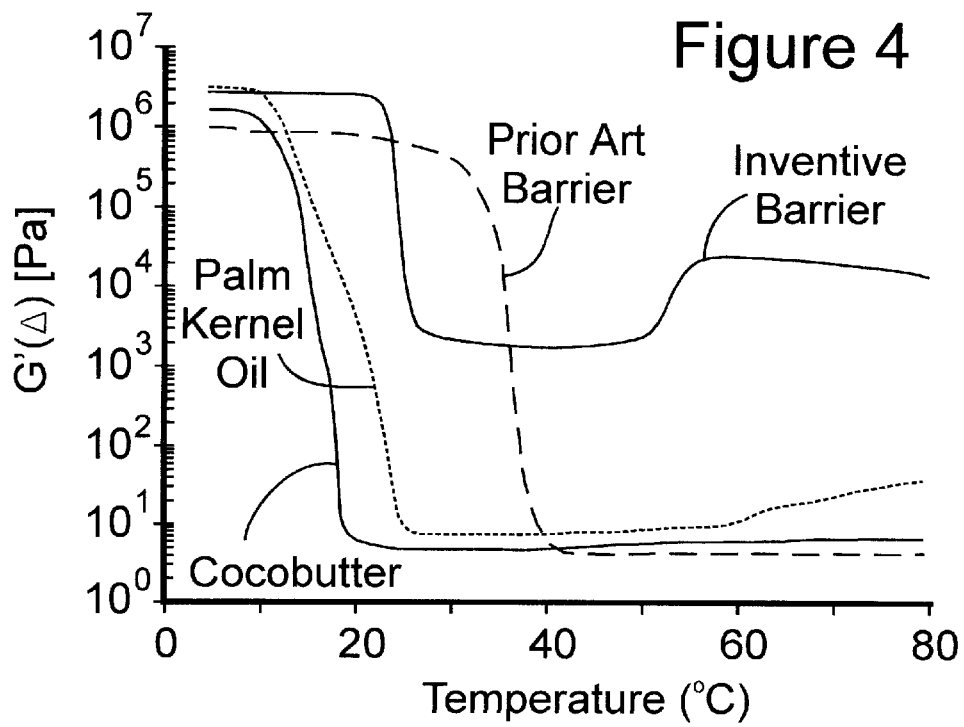
FIG. 4 compares the thermal and mechanical properties of the edible moisture barrier of this invention with other moisture barriers. The elastic modulus is plotted as a function of temperature.

The edible moisture barriers of the present invention provide unique thermal and mechanical properties. Indeed, it appears that these properties are largely responsible for the oven stability of the present edible moisture barriers. Generally, the compositions of the present invention have modulus values greater than about 500,000 Pa at 10° C. or less, less than about 3000 Pa at about 35 to about 50° C., and greater than about 5000 Pa (preferably greater than about 7000 Pa) at about 50 to about 80° C. As illustrated in FIG. 3, a preferred edible moisture barrier composition has high modulus values (e.g., about 3,000,000 Pa) at temperature of less than about 10° C. At intermediate temperatures (i.e., about 30 to about 50° C.), the modulus values are significant lower (i.e., less than about 2000 Pa). FIG. 7 shows that the edible barrier composition at 55° C. exhibits shear thinning behavior as indicated by an unusually low value (i.e., about 0.18) in power law index. Because of the reduced modulus and shear thinning properties, the edible moisture barrier composition can be readily applied (e.g., by spraying) to the desired food product at these intermediate temperatures. Additionally, the thermal properties allows the moisture barrier to readily melt at body temperature (about 37° C.) to provide a refreshing mouthfeel when consumed. At temperatures above about 50° C., however, the stress value increases significantly (i.e., to about 20,000 Pa) to provide the observed oven stability. FIG. 4 provides a comparison of the thermal and mechanical properties of the present edible moisture barrier with both a prior art moisture barrier (i.e., Myvacet 7-07 applied at a thickness of about 500 microns)

and coatings of palm kernel oil or cocobutter. As can be readily seen, these prior art barriers and/or coating are not oven stable.

Figure 5:
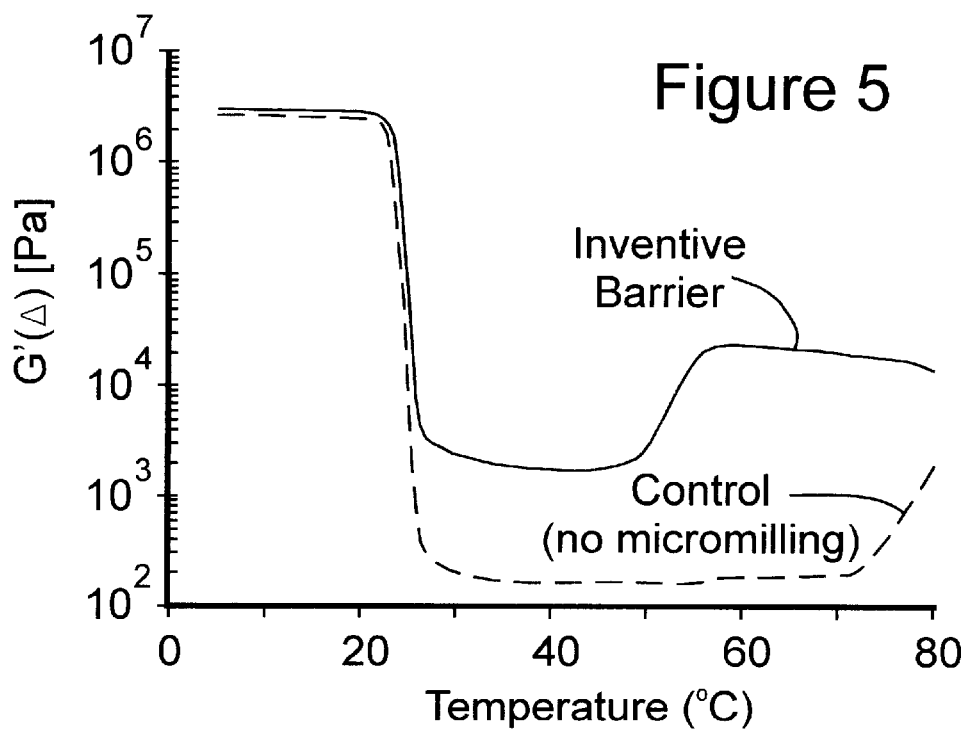
FIG. 5 compares the thermal and mechanical properties of the edible moisture barrier of this invention with a barrier formed using similar composition but in which the two components were not co-micromilled. The elastic modulus is plotted as a function of temperature.

It is important that the edible moisture barrier of the present invention is formed by co-micromilling the various components (i.e., the edible, low melting oil having a melting point of about 35° C. or lower and the edible, high melting fat having a melting point of about 70° C. or higher). FIG. 5 demonstrates the importance of the co-micromilling step. The inventive barrier of FIG. 5 was prepared using the edible moisture barrier composition of Example 1. The control composition was prepared using the same ingredients and in essentially the same manner except that the micromilling step was not used. Without the micromilling step, an oven stable edible moisture barrier is not produced as shown in FIG. 5.

Any conventional micromilling equipment can be used in the practice of the present invention. Suitable micromilling equipment includes, for example, ball mills, colloid mills, fluid energy mills, pin/disk mills, hammer mills, and the like. The edible, low melting oil and edible, high melting fat mixture, preferably in the form of a course emulsion, are micromilling at a temperature above the melting point of the edible, low melting oil but below the melting point of the edible, high melting fat to form a cream-type mixture. It is generally preferred that the edible, low melting oil and edible, high melting fat mixture is micromilled at a temperature of about 40 to about 100° C. and more preferably about 50 to about 60° C. Typically, the mixture is micromilled to obtain a cream-type composition having a particle size of about 1 to about 25 microns, preferably about 1 to about 15 microns, and more preferably about 1 to about 10 microns; generally, the particle size is preferably measured at about 10° C. above the melting point of the edible, low melting oil.

The edible moisture barrier of the present invention has organoleptic properties of taste, aftertaste, and mouthfeel that are imperceptible such that the consumer is unaware of the presence of the barrier when the product is consumed. Indeed, the edible moisture barrier of the present invention is rapid and clean melting, is free from residues, and has a creamy (i.e., smooth), non-waxy appearance and mouthfeel. Additionally, the edible moisture barrier composition of the present invention possesses a stable crystalline structure which resists the tendency to bloom or crack and provides good stability against thermal abuse (e.g., temperature recycling between about 5 and about 80° C.).

The following examples illustrate methods for carrying out the invention and should be understood to be illustrative of, but not limiting upon, the scope of the invention which is defined in the appended claims. Unless specified otherwise, all percentages, parts, and ratios are by weight.

EXAMPLE 1

Figure 6:
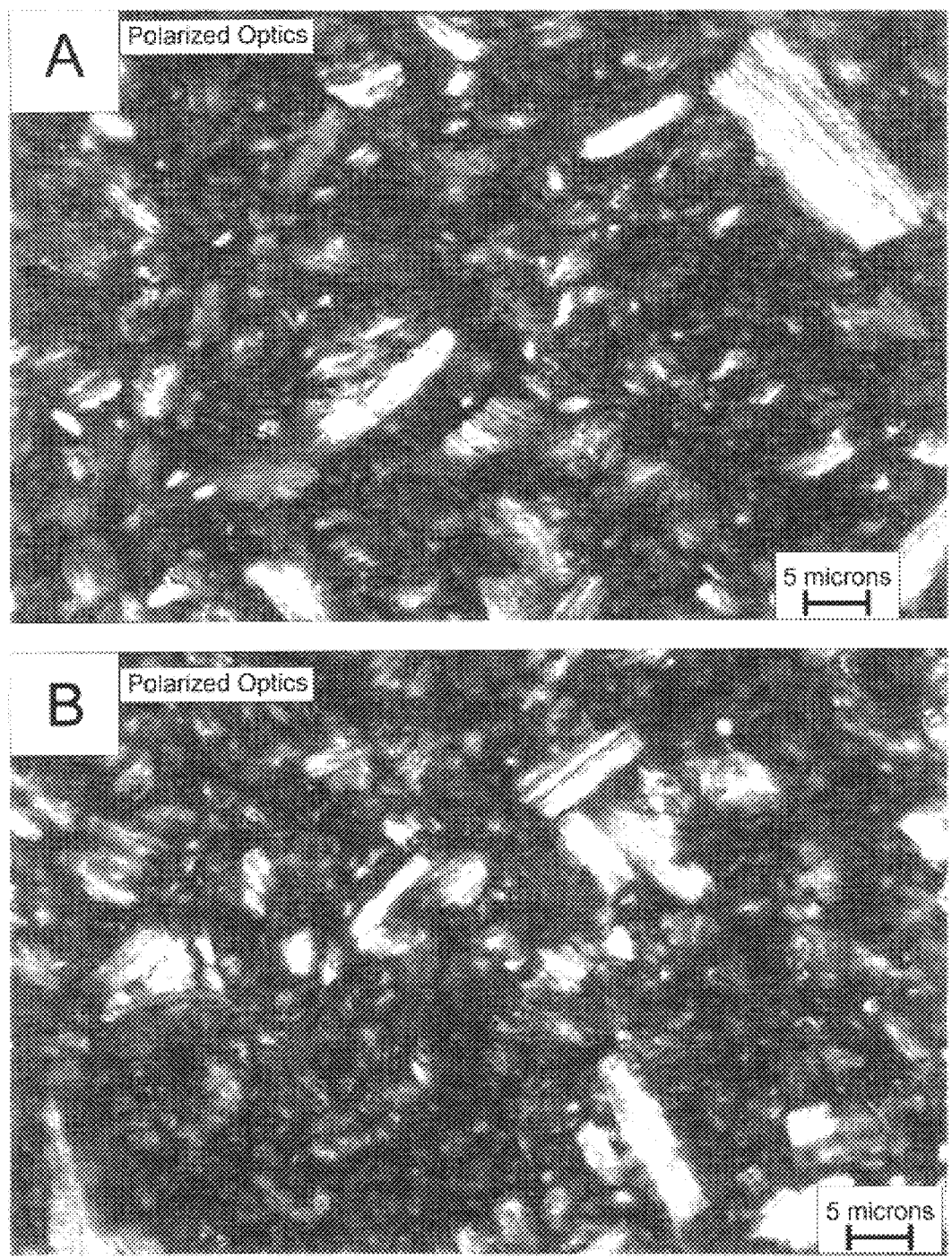
FIG. 6 provides micrographs (magnification about 1500×) of the moisture barrier of Example 1. Micromilled calcium stearte particles can be observed; submicron sized crystals of palm kernel oil cannot be seen clearly at this magnification. Panels A and B are different fields of view.

A moisture barrier composition of the present invention was prepared by blending about 35 parts of calcium (134° C. melting point; Fisher Scientific, N.J.) with about 65 parts of a melted blend of coconut oil and palm kernel oil (24° C. melting point; Aarhus, Inc, NJ) in an impeller mixture at about 60° C. to form a coarse dispersion. The coarse dispersion was micromilled twice through a high efficiency ball mill (Dynomill, Maywood, N.J.) at about 50 to about 60° C. to form a cream-like mixture having an average particle size of about 8 microns. The edible moisture barrier composition was cooled to, and stored at, room temperature until the formation of the edible moisture barrier was desired. FIG. 6 provides micrographs (magnification about 1500×) of the moisture barrier. The edible moisture barrier composition can be remelted to achieve the desired cream-like consistency for applying to the desired surface or surfaces of the food product. As shown in FIG. 5, a significant increase (about 200 fold) in modulus at about 30° C. was observed. An additional increase (about 100 fold) in modulus at about 55° C. or higher was also observed. This barrier composition also has a high degree of shear thinning as shown in FIG. 7. The unique rheology of this inventive composition was compared with prior art barrier materials (i.e., Myvacet 7-07) by coating the bottom of a petri dish with a thin layer of each material. At room temperature, each material formed a solid coating. When heated to 80° C., the inventive material remainednon-flowing whereas the prior art material was liquid.

EXAMPLE 2

Commercial cream cheese with water activity of about 0.98 was placed in a plastic cup. The barrier composition described in Example 1 was applied at 55° C. with a brush onto the top surface of cream cheese to form a thin and essentially complete barrier layer approximately 500 microns thick. Two control samples were prepared. The first control contained no moisture barrier. The second control was prepared in a similar manner to the inventive sample except that a Myvacet 7-07 barrier (about 500 microns thick) was used. The samples were maintained at ambient temperatures for about 10 minutes to allow the barrier compositions to solidify and then baked in a convection oven set at about 90° C. at a 45 degree angle until the cream cheese internal temperature reached about 80° C. After cooling to ambient conditions, the samples were placed in a 33 percent relative humidity environment; moisture losses were monitored over time. The moisture loss through the inventive barrier composition of Example 1 was more than about 99 percent less than either control sample (see FIG. 2).

EXAMPLE 3

The inventive moisture barrier composition of Example 1 was brushed onto a refrigerated log of cream cheese (about 14 grams, about 1.5 inches by about 1 inch by about 0.5 inches, and a water activity of about 0.98) to form a uniform film of about 500 microns thick. The coated cream cheese log was cooled and then enrobed with a dough sheet (about 40 grams and a water activity of about 0.85) to form a multiple phase food product. The resulting product was proofed, baked to an internal temperature of about 90° C., and then cooled. A control product was prepared in a similar manner except that no moisture barrier was applied.

Both the inventive product and the control product were stored under refrigeration conditions; the moisture loss from cheese phase to bread phase was monitored over time. The inventive sample had significantly less moisture migration from the cheese component to the bread component (see FIG. 8).

EXAMPLE 4

A moisture barrier composition of the present invention was prepared by blending about 35 parts of calcium (134° C. melting point; Fisher Scientific, NJ) with about 65 parts of anhydrous milk fat (32° C. melting point; Dairy Farmers of America, MO) in an impeller mixer at about 60° C. to form a coarse dispersion which was then twice passed through a high efficiency ball mill (Dynomill, Maywood, N.J.) at about 50 to about 60° C. to form a cream-like mixture having an average particle size of about 8 microns. This edible moisture barrier composition was cooled to, and stored at, room temperature until the formation of the edible moisture barrier was desired. Superior baking stability and barrier effectiveness similar to that of the barrier composition described in Example 1 were evident.

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. An edible moisture barrier composition suitable for forming an edible moisture barrier within a food product having components of differing water activities, said composition comprising an edible, low melting oil having a melting point of about 35° C. or lower and an edible, high melting fat having a melting point of about 70° C. or higher, wherein the edible, low melting oil and the edible, high melting fat are co-micromilled at a temperature above the melting point of the edible, low melting oil but below the melting point of the edible, high melting fat to form a cream-type mixture, and wherein the composition is oven stable.

2. The edible moisture barrier composition as defined in claim 1, wherein the composition contains about 60 to about 85 percent of the edible, low melting oil and about 15 to about 40 percent of the edible, high melting fat.

3. The edible moisture barrier composition as defined in claim 2, preferably, wherein the composition contains about 65 to about 75 percent of the edible, low melting oil and about 25 to about 35 percent of the edible, high melting fat.

4. The edible moisture barrier composition as defined in claim 3, wherein the edible, low melting oil and the edible, high melting fat are co-micromilled at a temperature of between about 10° C. above the melting point of the edible, low melting oil and about 20° C. below the melting point of the edible, high melting fat.

5. The edible moisture barrier composition as defined in claim 3, wherein the composition has a modulus of greater than about 500,000 Pa at temperatures of less than about 10° C., a modulus of less than about 3000 Pa at temperatures of about 35 to about 50° C., and a modulus of greater than about 5000 Pa at temperatures of above about 50° to about 80° C.

6. The edible moisture barrier composition as defined in claim 3, wherein the edible, low melting oil is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, and mixtures thereof, and the edible, high melting fat is selected from the group consisting of stearic acid, arachidic acid, behenic acid, lignoceric acid, glycerol monostearate, glycerol distearate, glycerol tristearate, calcium stearate, magnesium stearate, high melting sucrose polyesters, high melting fatty alcohols, high melting waxes, and mixtures thereof.

7. The edible moisture barrier composition as defined in claim 2, wherein the edible, low melting oil and the edible, high melting fat are co-micromilled at a temperature of between about 10° C. above the melting point of the edible, low melting oil and about 20° C. below the melting point of the edible, high melting fat.

8. The edible moisture barrier composition as defined in claim 2, wherein the composition has a modulus of greater than about 500,000 Pa at temperatures of less than about 10° C., a modulus of less than about 3000 Pa at temperatures of about 35 to about 50° C., and a modulus of greater than about 5000 Pa at temperatures of above about 500 to about 80° C.

9. The edible moisture barrier composition as defined in claim 2, wherein the edible, low melting oil is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, and mixtures thereof, and the edible, high melting fat is selected from the group consisting of stearic acid, arachidic acid, behenic acid, lignoceric acid, glycerol monostearate, glycerol distearate, glycerol tristearate, calcium stearate, magnesium stearate, high melting sucrose polyesters, high melting fatty alcohols, high melting waxes, and mixtures thereof.

10. The edible moisture barrier composition as defined in claim 1, wherein the edible, low melting oil and the edible, high melting fat are co-micromilled at a temperature of between about 10° C. above the melting point of the edible, low melting oil and about 20° C. below the melting point of the edible, high melting fat.

11. The edible moisture barrier composition as defined in claim 1, wherein the composition has a modulus of greater than about 500,000 Pa at temperatures of less than about 10° C., a modulus of less than about 3000 Pa at temperatures of about 35 to about 50° C., and a modulus of greater than about 5000 Pa at temperatures of above about 500 to about 80° C.

12. The edible moisture barrier composition as defined in claim 1, wherein the edible, low melting oil is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, and mixtures thereof, and the edible, high melting fat is selected from the group consisting of stearic acid, arachidic acid, behenic acid, lignoceric acid, glycerol monostearate, glycerol distearate, glycerol tristearate, calcium stearate, magnesium stearate, high melting sucrose polyesters, high melting fatty alcohols, high melting waxes, and mixtures thereof.

13. An edible moisture barrier between components of differing water activities in a food product, said edible moisture barrier comprising a layer of a composition comprising an edible, low melting oil having a melting point of about 35° C. or lower and an edible, high melting fat having a melting point of about 70° C. or higher, wherein the edible, low melting oil and the edible, high melting fat are co-micromilled at a temperature above the melting point of the edible, low melting oil but below the melting point of the edible, high melting fat to form a cream-type mixture.

14. The edible moisture barrier as defined in claim 13, wherein the edible moisture barrier is at least about 10 microns thick.

15. The edible moisture barrier as defined in claim 14, wherein the edible moisture barrier is about 20 to about 2000 microns thick.

16. The edible moisture barrier as defined in claim 15, wherein the edible moisture barrier is about 50 to about 750 microns thick.

17. The edible moisture barrier as defined in claim 14, wherein the composition contains about 60 to about 85 percent of the edible, low melting oil and about 15 to about 40 percent of the edible, high melting fat.

18. The edible moisture barrier as defined in claim 17, preferably, wherein the composition contains about 65 to about 75 percent of the edible, low melting oil and about 25 to about 35 percent of the edible, high melting fat.

19. The edible moisture barrier as defined in claim 18, wherein the edible, low melting oil and the edible, high melting fat are co-micromilled at a temperature of between about 10° C. above the melting point of the edible, low melting oil and about 20° C. below the melting point of the edible, high melting fat.

20. The edible moisture barrier as defined in claim 18, wherein the composition has a modulus of greater than about 500,000 Pa at temperatures of less than about 10° C., a modulus of less than about 3000 Pa at temperatures of about 35 to about 50° C., and a modulus of greater than about 5000 Pa at temperatures of above about 50° to about 80° C.

21. The edible moisture barrier as defined in claim 18, wherein the edible, low melting oil is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, and mixtures thereof, and the edible, high melting fat is selected from the group consisting of stearic acid, arachidic acid, behenic acid, lignoceric acid, glycerol monostearate, glycerol distearate, glycerol tristearate, calcium stearate, magnesium stearate, high melting sucrose polyesters, high melting fatty alcohols, high melting waxes, and mixtures thereof.

22. The edible moisture barrier as defined in claim 17, wherein the edible, low melting oil and the edible, high melting fat are co-micromilled at a temperature of between about 10° C. above the melting point of the edible, low melting oil and about 20° C. below the melting point of the edible, high melting fat.

23. The edible moisture barrier as defined in claim 17, wherein the composition has a modulus of greater than about 500,000 Pa at temperatures of less than about 10° C., a modulus of less than about 3000 Pa at temperatures of about 35 to about 50° C., and a modulus of greater than about 5000 Pa at temperatures of above about 500 to about 80° C.

24. The edible moisture barrier as defined in claim 17, wherein the edible, low melting oil is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, and mixtures thereof, and the edible, high melting fat is selected from the group consisting of stearic acid, arachidic acid, behenic acid, lignoceric acid, glycerol monostearate, glycerol distearate, glycerol tristearate, calcium stearate, magnesium stearate, high melting sucrose polyesters, high melting fatty alcohols, high melting waxes, and mixtures thereof.

25. The edible moisture barrier as defined in claim 14, wherein the edible, low melting oil and the edible, high melting fat are co-micromilled at a temperature of between about 10° C. above the melting point of the edible, low melting oil and about 20° C. below the melting point of the edible, high melting fat.

26. The edible moisture barrier as defined in claim 14, wherein the composition has a modulus of greater than about 500,000 Pa at temperatures of less than about 10° C., a modulus of less than about 3000 Pa at temperatures of about 35 to about 50° C., and a modulus of greater than about 5000 Pa at temperatures of above about 50° to about 80° C.

27. The edible moisture barrier as defined in claim 14, wherein the edible, low melting oil is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, and mixtures thereof, and the edible, high melting fat is selected from the group consisting of stearic acid, arachidic acid, behenic acid, lignoceric acid, glycerol monostearate, glycerol distearate, glycerol tristearate, calcium stearate, magnesium stearate, high melting sucrose polyesters, high melting fatty alcohols, high melting waxes, and mixtures thereof.

28. A method for preventing moisture migration between a first food component and a second food component having different water activities in a food product, the method comprising:
(1) blending an edible, low melting oil having a melting point of about 15 to about 35° C. and an edible, high melting fat having a melting point of about 70° C. or higher to form a mixture;
(2) micromilling the mixture at a temperature above the melting point of the edible, low melting oil but below the melting point of the edible, high melting fat to form a cream-type mixture; and
(3) applying the cream-type mixture to at least the first food component to form a layer of the edible moisture barrier effective for preventing moisture migration between the first component and the second food component.

29. The method as defined in claim 28, wherein the layer of the moisture barrier is at least about 10 microns thick.

30. The method as defined in claim 29, wherein the layer of the moisture barrier is about 20 to about 2000 microns thick.

31. The method as defined in claim 30, wherein the layer of the moisture barrier is about 50 to about 750 microns thick.

32. The method as defined in claim 28, wherein the mixture contains about 60 to about 85 percent of the edible, low melting oil and about 15 to about 40 percent of the edible, high melting fat, wherein the edible, low melting oil is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, and mixtures thereof, and the edible, high melting fat is selected from the group consisting of stearic acid, arachidic acid, behenic acid, lignoceric acid, glycerol monostearate, glycerol distearate, glycerol tristearate, calcium stearate, magnesium stearate, high melting sucrose polyesters, high melting fatty alcohols, high melting waxes, and mixtures thereof.

33. The method as defined in claim 32, wherein the mixture contains about 65 to about 75 percent of the edible, low melting oil and about 25 to about 35 percent of the edible, high melting fat.

34. The method as defined in claim 32, wherein the mixture is micromilled at a temperature of between about 10° C. above the melting point of the edible, low melting oil and about 20° C. below the melting point of the edible, high melting fat.

35. The method as defined in claim 32, wherein the cream-type mixture has a modulus of greater than about 500,000 Pa at temperatures of less than about 10° C., a modulus of less than about 3000 Pa at temperatures of about 35 to about 50° C., and a modulus of greater than about 5000 Pa at temperatures of above about 500 to about 80° C.

36. The method as defined in claim 28, wherein the mixture contains about 60 to about 85 percent of the edible, low melting oil and about 15 to about 40 percent of the edible, high melting fat, wherein the edible, low melting oil is selected from the group consisting of coconut oil, palm kernel oil, rapeesed oil soybean oil, palm oil, sunflower oil, corn oil, canola oil, cottonseed oil, peanut oil, cocoa butter, anhydrous milkfat, lard, beef fat, and mixtures thereof, and the edible, high melting fat is selected from the group consisting of stearic acid, arachidic acid, behenic acid, lignoceric acid, glycerol monosterate, glycerol distearate, glycerol tristearate, calcium stearate, magnesium stearate, high melting sucrose polyesters, high melting fatty alchohols, high melting waxes, and mixtures thereof.

37. The method as defined in claim 36, wherein the mixture contains about 65 to about 75 percent of the edible, low melting oil and about 25 to about 35 percent of the edible, high melting fat.

38. The method as defined in claim 36, wherein the mixture is micromilled at a temperature of between about 10° C. above the melting point of the edible, low melting oil and about 20° C. below the melting point of the edible, high melting fat.

39. The method as defined in claim 36, wherein the cream-type mixture has a modulus of greater than about 500,000 Pa at temperatures of less than about 10° C., a modulus of less than about 3000 Pa at temperatures of about 35 to about 50° C., and a modulus of greater than about 5000 Pa at temperatures of above about 500 to about 80° C.

* * * * *

UNITED STATES PATENT AND TRADEMARK OFFICE
CERTIFICATE OF CORRECTION

PATENT NO. : 6,472,006 B1
DATED : October 29, 2002
INVENTOR(S) : Loh et al.

It is certified that error appears in the above-identified patent and that said Letters Patent is hereby corrected as shown below:

Column 12,
Lines 2 and 27, change "500" to -- 50° --.

Column 13,
Line 36, change "500" to -- 50° --.

Column 14,
Line 59, change "500" to -- 50° --.
Line 60, change "28" to -- 29 --.

Column 16,
Line 10, change "500" to -- 50° --.

Signed and Sealed this

Twenty-ninth Day of April, 2003

JAMES E. ROGAN
*Director of the United States Patent and Trademark Office*